United States Patent [19]
Dittrich et al.

[11] Patent Number: 5,368,332
[45] Date of Patent: Nov. 29, 1994

[54] APPLICATOR TANK ASSEMBLY FOR A TRACTOR

[76] Inventors: Keith J. Dittrich, R.R. 1, Box 75; Dennis G. Petersen, R.R. 2, Box B2, both of Tilden, Nebr. 68781; John M. Dittrich, R.R. 2, Box 156, Meadow Grove, Nebr. 68752

[21] Appl. No.: 949,999

[22] Filed: Sep. 24, 1992

[51] Int. Cl.5 ............................................. B60P 3/22
[52] U.S. Cl. .................................. 280/838; 280/830; 239/146; 239/172
[58] Field of Search ..................... 280/830, 834, 838; 239/722, 146, 147, 159, 172; 169/24; 180/9, 9.1

[56] References Cited

U.S. PATENT DOCUMENTS

| | | | |
|---|---|---|---|
| 2,200,764 | 5/1940 | Baker et al. | 280/834 |
| 2,376,336 | 5/1945 | Brown | 280/830 |
| 3,491,949 | 1/1970 | Hairston | 239/172 |
| 4,602,742 | 7/1986 | Penson | 239/172 |
| 4,725,004 | 2/1988 | Baran | 239/159 |
| 5,098,017 | 3/1992 | Ballu | 239/172 |
| 5,113,946 | 5/1992 | Cooper | 169/24 |

FOREIGN PATENT DOCUMENTS 0148655  8/1962  U.S.S.R. .......................... 239/172

*Primary Examiner*—Margaret A. Focarino
*Assistant Examiner*—Anne Marie Boehler
*Attorney, Agent, or Firm*—Michael I. Kroll

[57] ABSTRACT

An applicator tank assembly is provided for a tractor being an endless tracked agricultural type having a cab and side fenders. The applicator tank assembly consists of a structure for holding chemicals therein. A mechanism is for securing the holding structure to a back portion of the tractor behind the cab and over the side fenders. It will not hinder the weight balance of the tractor and will not interfere with the vision of the operator when the tractor is pulling an agricultural implement.

10 Claims, 3 Drawing Sheets

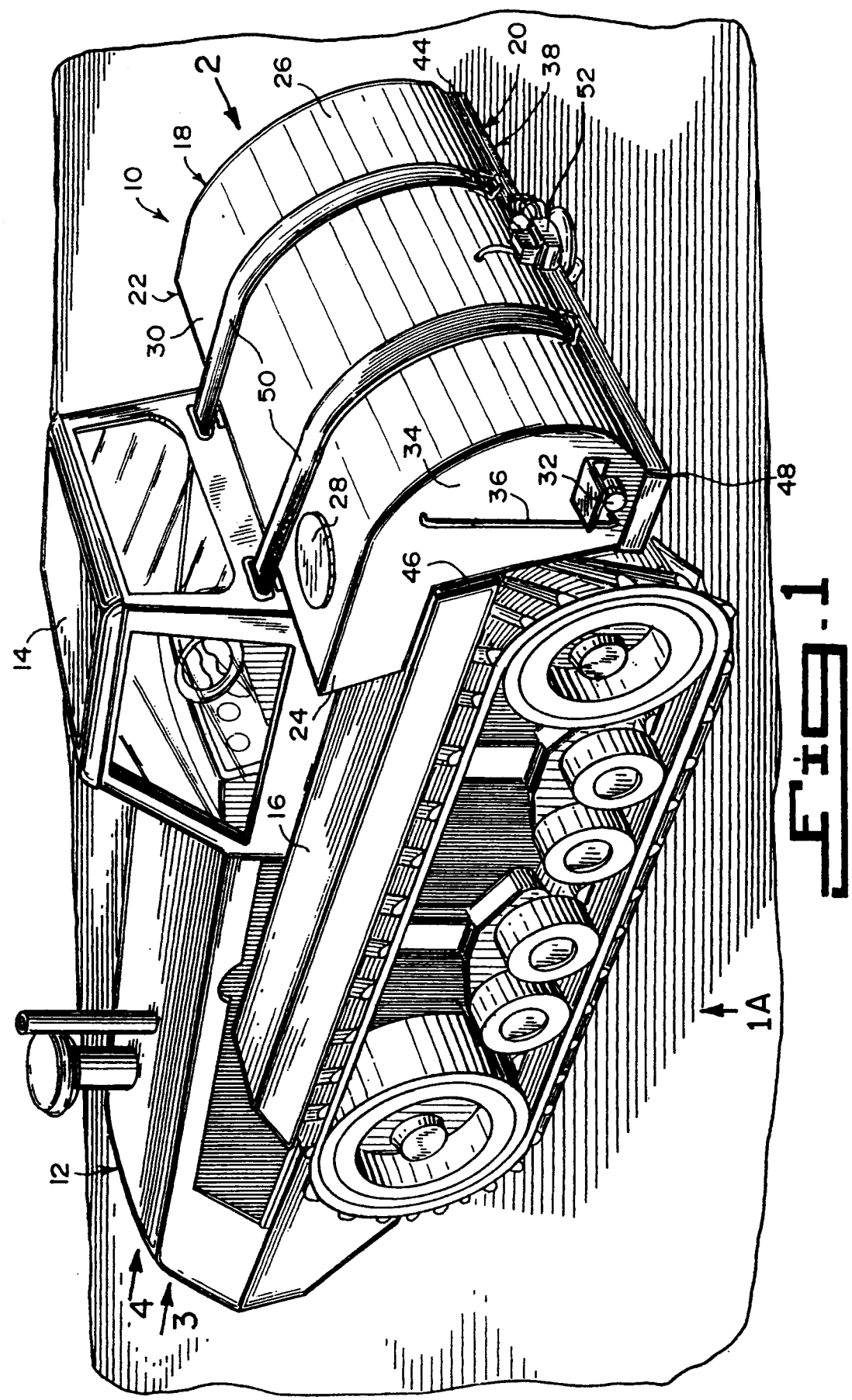

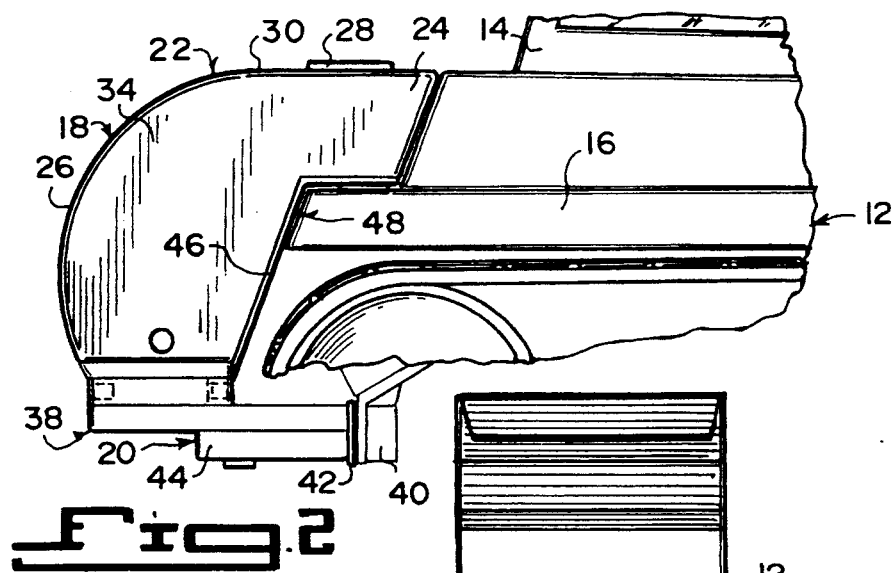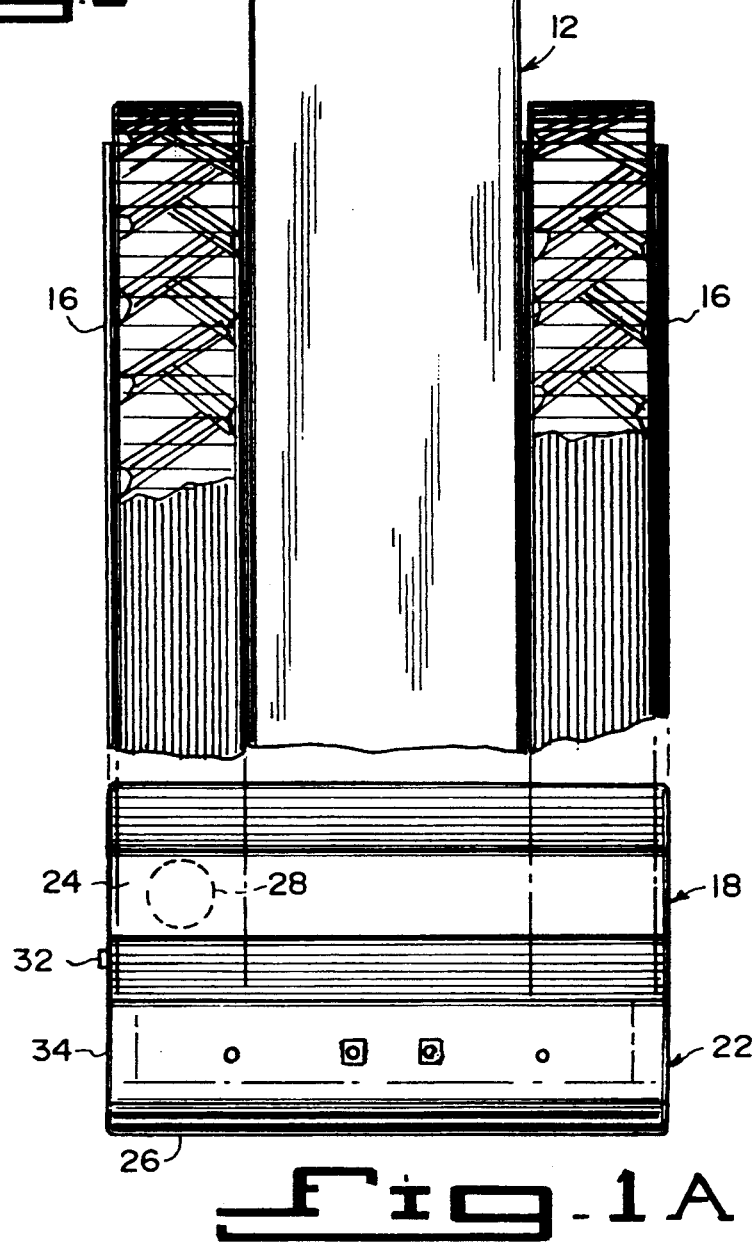

APPLICATOR TANK ASSEMBLY FOR A TRACTOR

BACKGROUND OF THE INVENTION

1. Field of the Invention

The instant invention relates generally to agricultural equipment and more specifically it relates to an applicator tank assembly for a tractor.

2. Description of the Prior Art

Numerous configurations of agricultural equipment have been designed over the past years and typically were used for a specific purpose such as hoes, plows, reapers, cultivators, harrows, planting machines and the like to work the land. While these units may be suitable for the particular purpose to which they address, they would not be as suitable for the purposes of the present invention as heretofore described.

SUMMARY OF THE INVENTION

A first object of the present invention is to provide an applicator tank assembly for a tractor that will overcome the shortcomings of the prior art devices.

A second object is to provide an applicator tank assembly for a tractor, in which the compact unit displaces a pulled wheel type applicator tank, which fully utilizes the low compaction advantages of the tracked challenger and avoiding the compaction inherent to any pulled applicator tank.

A third object is to provide an applicator tank assembly for a tractor, in which the compact unit displaces a pulled applicator tank, thereby dramatically increasing maneuverability of the tractor and any pulled implement.

A fourth object is to provide an applicator tank assembly for a tractor, which is compact and is mounted to the rear of the tractor, so that it will not hinder the weight balance of the tractor.

A fifth object is to provide an applicator tank assembly for a tractor, in which the instant invention will not interfere with the vision of the operator of the tractor, when the tractor is pulling an agricultural implement.

A sixth object is to provide an applicator tank assembly for a tractor that is simple and easy to use and easy to attach and remove.

A seventh objective allows a large capacity of liquid to be applied and is in the order of 800 gallons.

An eighth object is to provide an applicator tank assembly for a tractor that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a tractor with the instant invention installed thereto ready to be utilized.

FIG. 1A is a bottom view taken in direction of arrow 1A in FIG. 1, with parts broken away and in phantom.

FIG. 2 is a side view taken in direction of arrow 2 in FIG. 1, with parts broken away.

DETAILED DESCRIPTION OF THE PREFERRED EMBODIMENTS

Figure 3:
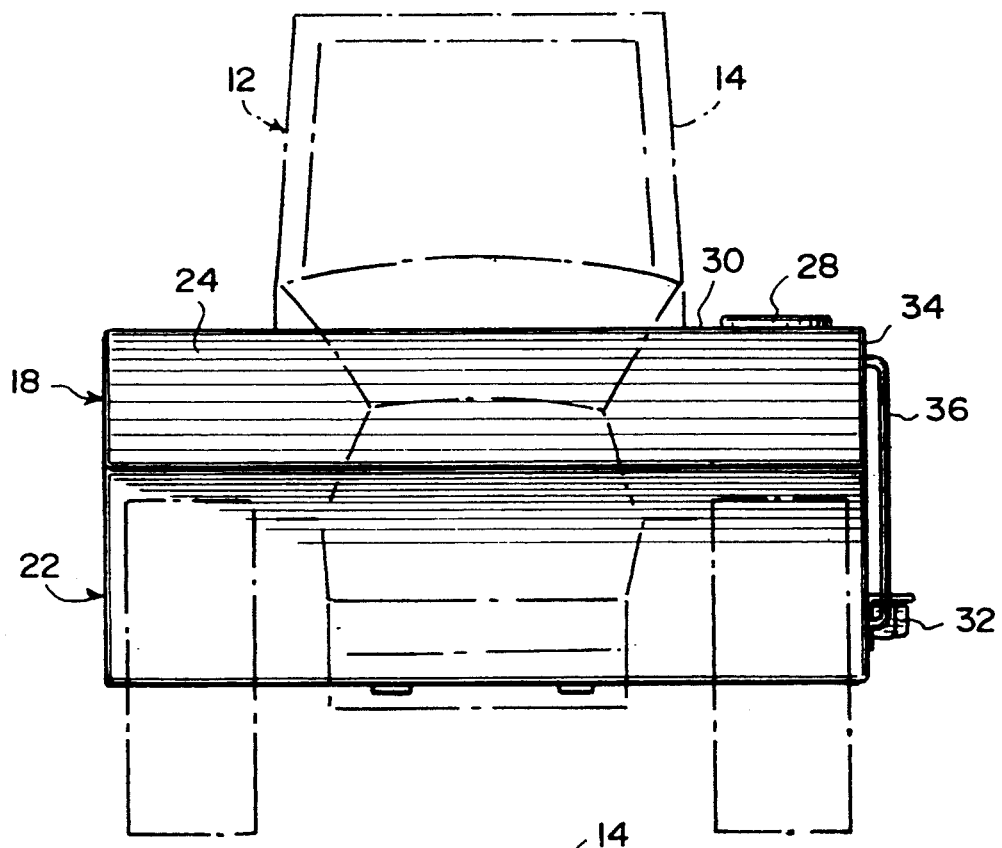
FIG. 3 is a front view taken in direction of arrow 3 in FIG. 1, showing the tractor in phantom, so as to see the applicator tank.
Figure 4:
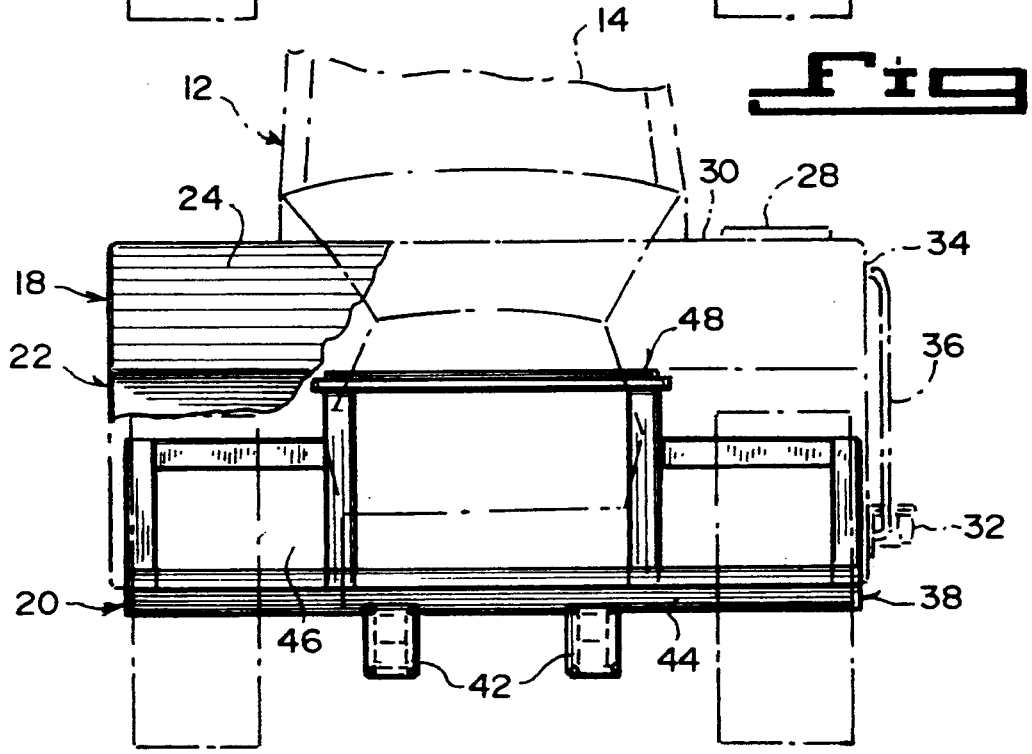
FIG. 4 is a front view taken in direction of arrow 4 in FIG. 1, showing the tractor and a portion of the applicator tank in phantom, so as to see the frame.

Turning now descriptively to the drawings, in which similar reference characters denote similar elements throughout the several views, the Figures illustrate an applicator tank assembly 10 for an endless tracked agricultural tractor, preferably of the CATERPILLAR Challenger agricultural type, having a cab 14 and side fenders 16. The applicator tank assembly 10 consists of a structure 18 for holding chemicals therein. A mechanism 20 is for securing the holding structure 18 to a back portion of the tractor 12 behind the cab 14 and over the side fenders 16. It will not hinder with the weight balance of the tractor 12 and will not interfere with the vision of the operator when the tractor 12 is pulling an agricultural implement.

The holding structure 18 is a tank 22, which can be fabricated out of fiberglass, stainless steel and other suitable materials, sized and shaped to fit compactly behind the cab 14 and over the side fenders 16 of the tractor 12. The tank 22 includes an overhang portion 24 to fit over rear portions of the side fenders 16 and behind the cab 14 of the tractor 12.

The tank 22 contains a curved back wall 26 and a removable filler cap 28, which is located on the top 30 thereof, so that the chemicals can be applied into the fiberglass tank 22.

The tank 22 also includes a fill valve 32 located on one side 34 thereof, so that water can be applied into the tank 22. A sight gauge 36 is located on the one side 34 thereof, so that the liquid level in the tank 22 can be seen therefrom.

The securing mechanism 20 is a support structure 38 mounted between the undercarriage 40 of the tractor 12, behind the cab 14 and the rear portion of the side fenders 16, so that the tank 22 can sit upon the support structure 38 at the rear of the tractor 12. The support structure 38 contains a pair of lower brackets 42, so that lower inner portion of the support structure 38 is mounted to the undercarriage 40 of the tractor 12.

The support structure 38 is fabricated out of steel tubing 44 and sheeting 46 to form a frame member 48 to secure the tank 22. The support structure 38 further includes a pair of spaced apart straps 50 secured behind a rear portion of the cab 14 to the lower outer portion of the frame member 48 over the curved back wall 26 of the tank 22 to retain the tank 22 in place.

Chemical pumping equipment 52 is mounted to the lower outer portion of the frame member 48 and is fluidly coupled to the tank 22, so that the chemicals can be dispensed therefrom.

The size of the tank 22 can be typically, but not limited to, forty eight inches in height, sixty six inches in depth at the top, twenty inches in depth at the base and one hundred and ten inches in length. The height of the overhang portion 24 is eighteen inches, while its depth is thirty seven inches.

The steel tubing 44 can be typically, but not limited to, four by four inches in cross section. The steel sheeting 46 can be typically, but not limited to, one eight of an inch in thickness.

LIST OF REFERENCE NUMBERS 10 applicator tank assembly
12 tractor
14 cab
16 side fenders
18 holding structure
20 securing mechanism
22 tank for 18
24 overhang portion of 22
26 curved back wall of 22
28 removable filler cap
30 top of 22
32 fill valve
34 side of 22
36 sight gauge
38 support structure for 20
40 undercarriage of 12
42 lower bracket
44 steel tubing
46 steel sheeting
48 frame member
50 strap It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An applicator tank assembly for an endless track agricultural tractor having a cab and side fenders, said applicator tank assembly comprising:
    a) a tank for holding chemicals therein, said tank is fabricated out of fiberglass and has a curved back wall and an overhang portion sized and shaped to fit compactly, behind the cab and over the side fenders of the tractor, a removable filler cap is located on the top of the tank, so that chemicals can be applied into the tank, and a fill valve is located on one side of the tank, so that water can be applied into the tank; and
    b) means for securing said tank to a back portion of the tractor behind the cab and over the side fenders, so that it will not hinder the weight balance of the tractor and will not interfere with the vision of the operator when the tractor is pulling an agricultural implement, said tank has a front portion, said back portion of said tractor and the front portion of said tank both have contours, where they meet, which are identical to each other so as to eliminate any gaps and provide good balance.

2. An applicator tank assembly as recited in claim 1, wherein said tank includes a sight gauge located on one side thereof, so that the liquid level in said tank can be seen therefrom.

3. An applicator tank assembly as recited in claim 2, wherein said securing means is a support structure mounted between the under carriage of the tractor behind the cab and the rear portions of the side fenders, so that said tank can sit upon said support structure at the rear of the tractor.

4. An applicator tank assembly as recited in claim 3, wherein said support structure includes a pair of lower brackets, so that a lower inner portion of said support structure is mounted to the undercarriage of the tractor.

5. An applicator tank assembly as recited in claim 4, wherein said support structure is fabricated out of steel tubing and sheeting to form a frame member to secure said tank.

6. An applicator tank assembly as recited in claim 5, wherein said support structure further includes a pair of spaced apart straps secured behind a rear portion of the cab to the lower outer portion of the frame member over said curved back wall of said tank to retain said tank in place.

7. An applicator tank assembly as recited in claim 6, further including chemical pumping equipment mounted to the lower outer portion of said frame member fluidly coupled to said tank, so that the chemicals can be dispensed therefrom.

8. An applicator tank assembly as recited in claim 7, wherein said fill valve of said tank is protected by a valve protector.

9. An applicator tank assembly as recited in claim 8, wherein said valve protector is a horizontal plate disposed above said fill valve on said applicator tank.

10. An applicator tank assembly as recited in claim 9, wherein said applicator tank assembly has a large capacity of liquid to be applied and is in the order of 800 gallons.

* * * * *